United States Patent [19]

Norden

[11] Patent Number: 5,053,918
[45] Date of Patent: Oct. 1, 1991

[54] THREE PHASE BUS BAR APPARATUS HAVING SELECTIVELY POSITIONED INTEREXCHANGEABLE LINKS

[75] Inventor: Alexander R. Norden, Boca Raton, Fla.

[73] Assignee: Connectron, Inc., Laurence Harbor, N.J.

[21] Appl. No.: 455,587

[22] Filed: Dec. 22, 1989

[51] Int. Cl.[5] .............................................. H02B 1/20
[52] U.S. Cl. .................................. 361/355; 439/207; 439/217; 361/361
[58] Field of Search ............... 361/341, 342, 355, 361; 439/110, 114, 119, 207, 208, 210, 211, 212, 213, 217, 224; 174/71 B, 88 B

[56] References Cited

U.S. PATENT DOCUMENTS 2,059,987 11/1936 Frank et al. .................... 439/207
4,229,061 10/1980 Majors ............................. 439/217

FOREIGN PATENT DOCUMENTS 1091173 10/1960 Fed. Rep. of Germany .... 174/88 B
2562344 10/1985 France ............................. 361/342

Primary Examiner—Leo P. Picard
Assistant Examiner—Michael W. Phillips

[57] ABSTRACT

The disclosed electrical apparatus involves multiple poles of an electrical device which bear links for plug-in connection to a set of three-phase bus bars; the links for the three spaced-apart bus bars are shaped and proportioned alike.

20 Claims, 2 Drawing Sheets

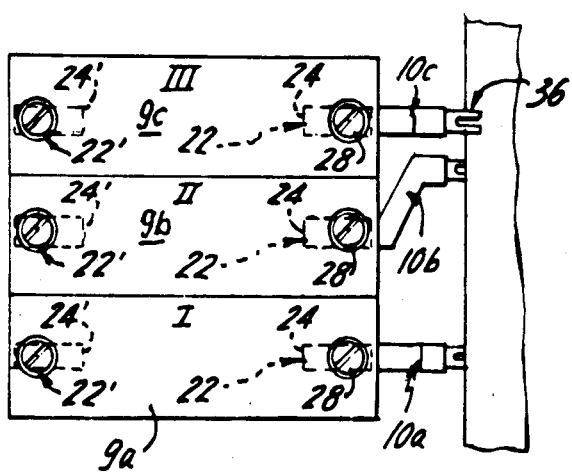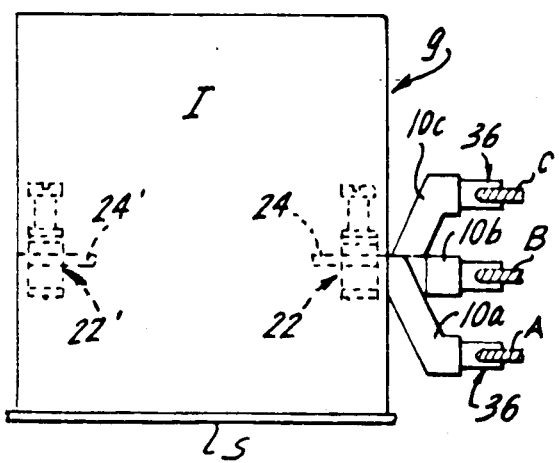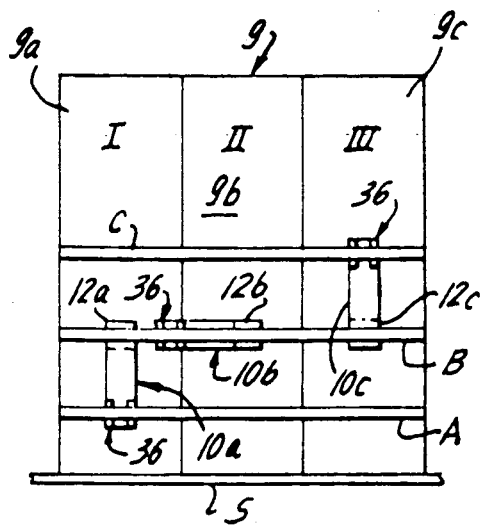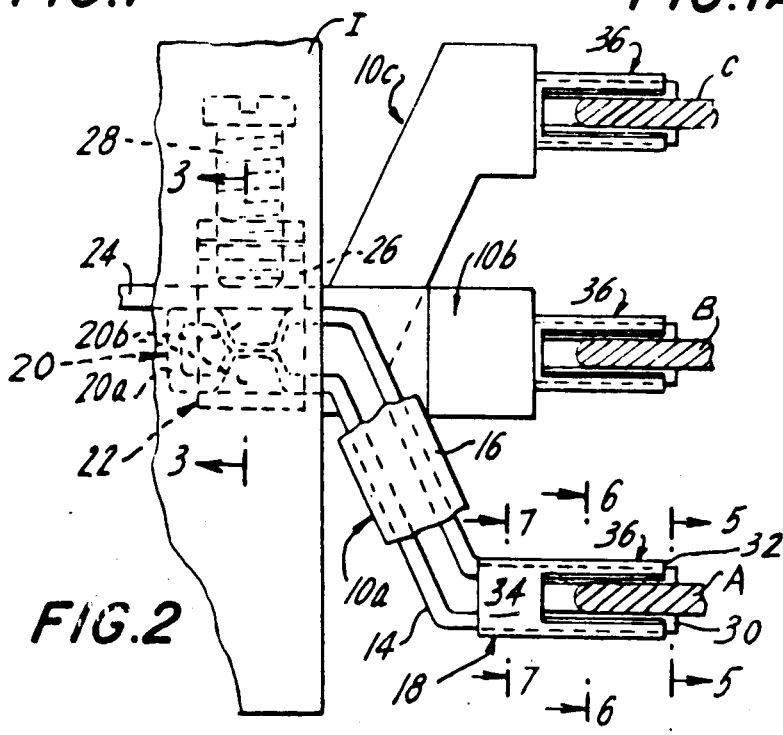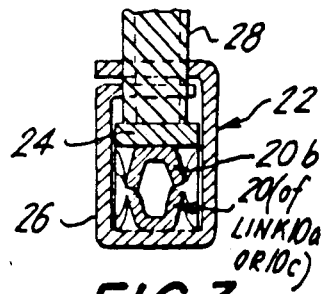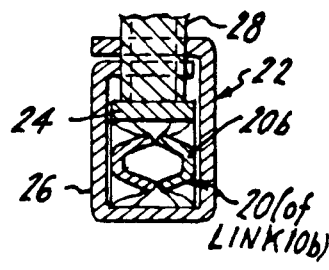

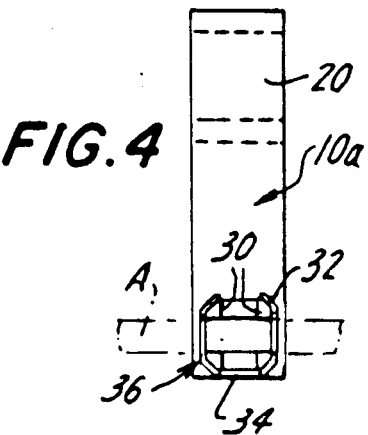
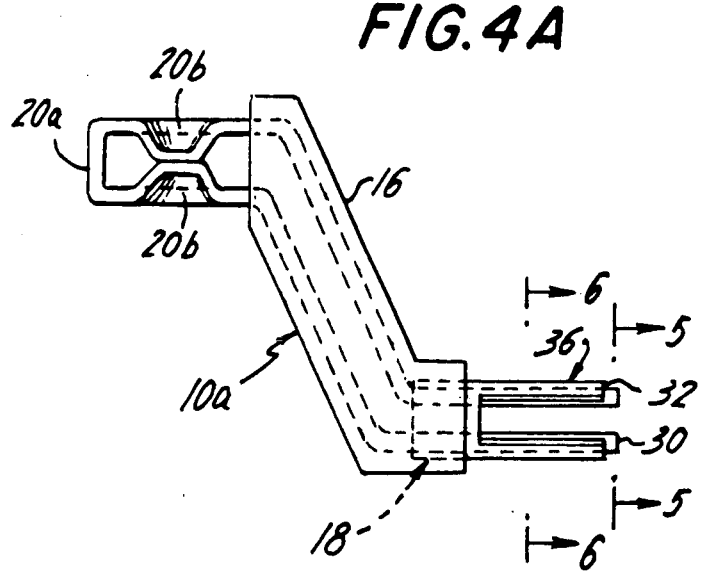
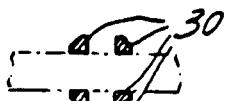

THREE PHASE BUS BAR APPARATUS HAVING SELECTIVELY POSITIONED INTEREXCHANGEABLE LINKS

This invention relates to electrical equipment in which electrical devices have terminals connected to three-phase bus bars.

Electrical devices such as switches, circuit breakers, fuse holders and so forth are routinely assembled to form panelboards, switchboards, etc. in which the electrical devices are connected to a set of parallel bus bars. In a widely used form of construction, terminals of the electrical devices are aligned in a row that extends parallel to the bus bars. These terminals may be multiple terminals of a two- or three-pole electrical device or they may be terminals of an assembled group of single-pole devices, or combination of single-pole and multi-pole devices. Two or more different forms of links are required to connect the device terminals to the bus bars.

In the novel illustrative embodiment of the invention described in detail below and shown in the accompanying drawings, only one form of link is used for connecting the line terminal of a single-pole device or each line terminal of a multi-pole device to any of the set of bus bars, the line terminals being in a row parallel to the bus bars.

a device is provided having a link term.inal for connection to a terminal of an electrical device and having a bus bar connecting terminal, and having a conductor interconnecting its terminals. The link as a whole extends in any of three discrete directions from the device terminal. The device terminals of the links and terminals of the devices have a keyed relationship that establishes each of those discrete directions of the link as a whole.

The bus bar terminal of the link is adapted to make connection with a bus bar in any of the three dispositions positions of the link. In the exemplary apparatus described below and shown in the drawings, the bus bar connecting terminal of the link makes plug-in connection to one of the bus bars in each of the three selective directions of the link. Of particular merit, the link can extend upward from the device terminal, or downward, or to one side,in three directions that are at right angles to one another, and the plug-in terminal of the link has a cluster of contact fingers that grip a bus bar in each of those three dispositions of the link.

The lature and various aspects of the invention will be better appreciated by reviewing the following detailed description of an illustrative embodiment shown in the accompanying drawings.

In the drawings:

FIGS. 1, 1A and 1B are somewhat diagrammatic side, and top plan end, views, respectively, of an electrical device assembled to bus bars.

FIG. 2 is a fragmentary view of the apparatus in FIG. 1, drawn to larger scale;

FIG. 3 is a cross-section of a terminal of an electrical device and a device terminal of a connecting link for poles I and III (FIG. 1A) as seen-at the plane 3—3 in FIG. 2;

FIG. 3A is a cross-section like FIG. 3 of the corresponding terminals, for pole II;

FIG. 4 is a view of an end connecting link shown in FIG. 2, as that link is seen from the right of FIG. 2;

FIG. 4A is a side view of the connecting link of FIG. 4, as seen in FIG. 2; and

FIGS. 5, 6 and 7, are cross-sections of the plug-in terminal of a connecting link as seen at the planes 5—5, 6—6 and 7—7, respectively of FIG. 2;

Three poles I, II and III are parts of a three-pole electrical device a are shown in FIGS. 1A and 1B, connected to bus bars A, B and C by respective connecting links 10a, 10b and 10c. The bus bars are proportionally wide and thin and they are parallel to each other and spaced;apart regularly. The edges of the bars are in a common plane and their broad sides are parallel. The bars are supported in this configuration by any of various known forms of insulation (not shown).

Five terminals 22 of the electrical device are spaced apart in a row (FIG. 1B) at a common level spaced from support the device is secured; terminals all of the 22 are at the same level as bus bar B, thus being opposite to and spaced from bus bar B. Links 10a, 10b and 10c identical and essentially rigid. three links have device terminals 12a, 12b and 12c (FIG. 1A) secured to line terminals 22. Load terminals 22' at the opposite ends of poles I, II and III are for connection to protected or controlled circuits. Because the line and load terminals are often interchangeable, they are referred to below more generally as first and second terminals.

In the form shown, poles I, II and III are parts 9a, 9b and 9c of a three-pole circuit breaker. However, it is common for electrical devices to be of the so-called unit-pole construction, in which each pole I, II and III is a mechanically separate device 9a, 9b and 9c. Any number of unit-pole electrical devices I may be assembled side-by-side, each equipped with its link 10a; any number of unit-pole devices II equipped with its link 10b may be assembled side-by-side; and any number of unit-pole devices III equipped with respective links 10c may be assembled side-by-side. Such unit-pole devices may be assembled in any chosen mixed sequence. Moreover, any two poles I and II or II and III may be a unitary two-pole electrical device. The electrical device shown in FIG. 1A also represents a row of such unit-pole devices 9a, 9b and 9c assembled side-by-side. Furthermore, a series of single-pole and two-pole devices properly equipped with a link for each pole may be used together with three-pole devices.

Pole I of FIG. 1A is shown in FIG. 2 with its link 10a; and links 10b and 10c also appear in FIG. 2 for poles II and III behind pole I. Each link comprises a formed metal strip 14 of high-conductivity metal such as copper, a shroud 16 of molded insulation, and a spring clip 18. Terminal 22 of pole I (FIG. 2) grips the device terminal 20 of link 10a. The device terminals 20 of the links 10a, 10b and 10c are individually designated 12a, 12b and 12c in FIG. 1A. Each connecting link 10b and 10c in FIG. 2 has a plug-in terminal 36 that grips and makes low-resistance contact to a respective bus bar A, B or C.

Strip 14 has a bent portion 20a forming part of link terminal 20. Crimped upper and lower portions 20b of strip 14 have mutually abutting edges. Accordingly, the region of strip 14 near bend 20a forms a link terminal whose cross-section is essentially square and rigid.

Five terminal 22 of pole I (like poles II and III) has a terminal conductor 24, a four-wall clamp 26 and a screw 28 that constitute the line terminal 22. The screw is threaded through a top double-thick wall of clamp 26, it bears against conductor 24, and it draws the opposite wall of clamp 26 upward so that the terminal 20 is gripped between a wall of the clamp and conductor 24.

As shown in FIGS. 4-6, the ends of strip 14 of link 10a are shaped to provide four contact fingers 30. These fingers form pairs that are spaced apart equally at corners of an imaginary square. A bus bar is tightly receivable edgewise either vertically or horizontally between pairs of fingers 30. Spring clip 18 as of spring steel has spring elements 32 that bear against contact fingers 30 and provide contact pressure. Spring clip 18 includes a band 34 (FIGS. 2 and 7) from which the spring elements extend. This band firmly and securely embraces two lengths of strip 14 (FIG. 7). The space between the contact fingers of each pair of contact fingers is less than the thickness of a bus bar before a bus bar is inserted. When a bus bar is forced between the fingers of each pair, they become essentially parallel.

Insulating shroud 16 covers band 34 of link 10a. (Shroud 16 is omitted from FIG. 7 and does not appear in the region of band 34 of link 10a in FIG. 2.)

When the plug-in formation 36 comprising the cluster of fingers 30 and 32 is forced onto a bus bar, the contact fingers make highly effective contact to the bus bar. This is true of clusters 36 of the vertically extending links 10a and 10c (FIG. 1A), and it is true, too, of the cluster 36 of the horizontally extending link 10b, as shown in FIGS. 1 and 2. Terminals 12a and 36 the are parallel to each other but they are displaced from each other by the off-set length of the link between those terminals of the link.

The discrete fixed attitude of each link in relation to its electrical device enables its bus bar terminal to make plug-in connection to a selected bus bar. The described square (or rectangular) cross-section of link terminal 20 and the clamping terminal 22 of the electrical device are highly effective keying formations for establishing any one of the three discrete attitudes of the link, as shown and described. In FIG. 3, device terminal 20 of link 10a is keyed to a temrinal 22 of device 9 to establish the desired attitude of links 10a and 10c; and in FIG. 3A, terminal 20 is keyed to line terminal 22 to establish the desired attitude of link 10b. Obviously, many other forms of terminals 20 and 22 can be devised having other keying formations such that terminals 20 are gripped properly by respective terminals 22 to preposition terminals 36 for plug-in assembly to the bus bars as the pole or poles of the electrical device(s) I, II, and III slide along support S toward the bus bars.

The electrical apparatus shown in the accompanying drawing and described in detail above represents an exemplary embodiment of the invention. However, this apparatus may be variously modified by those skilled in the art so that the invention should be construed broadly in accordance with its true spirit and scope.

What is claimed is:

1. Electrical apparatus for connection to at least three parallel spaced-apart bus bars, said apparatus comprising multiple poles each having first and second terminals spaced apart end-to-end of the pole, the first terminals of the multiple poles being disposed in a row, and multiple links for connecting the respective first terminals to any of the bus bars when said row of first terminals is parallel to the bus bars, each of said links having a device terminal for making connection to a said first terminal of a pole and a bus bar terminal for making connection to a bus bar and each link having a conductor between its terminals, said links being shaped and proportioned alike, being interchangeable for connecting any of said first terminals to any of said three bus bars.

2. Electrical apparatus as in claim 1 wherein two of said links extend fixedly at right angles to each other from respective first terminals of the poles, the bus bar terminals of the links being positioned for connection to respective bus bars.

3. Electrical apparatus as in claim 2 wherein the bus bar terminals of each link comprises a cluster of resilient plug-in contact fingers.

4. Electrical apparatus as in claim 3 wherein said cluster of plug-in contact fingers comprises four fingers at the corners of an imaginary square for gripping a bus bar in either of two right-angled relationships of said links to respective bus bars.

5. Electrical apparatus as set forth in claim 1 wherein the first terminal of each of said poles comprises a fastener gripping the device terminal of respective one of said links, said device terminal of each link having at least one keying formation for establishing a discrete orientation of each link in relation to its pole with its bus bar terminal in connection-making alignment with a.

6. Electrical apparatus as in claim 5 wherein the bus bar terminal of each link comprises a cluster of resilient plug-in contact fingers located at the four corners, respectively, of a square.

7. Electrical apparatus as in claim 2 wherein three of said poles constitute a three-pole device, three of said links being secured to respective first terminals of said three-pole device and having their bus bar terminals preposit-ioned in connection-making alignment wrth said three bus bars, respectively.

8. Electrical apparatus as in claim 7 wherein the device terminal of each link has a keying formation and wherein said first terminal of each pole is a fastener that grips the device terminal and coacts with the keying formation to establish a discrete orientation of the link in relation to the three-pole device so that the bus bar terminals of the links are prepositioned in connection-making alignment with three bus bars when said row of first terminals extends parallel to the bus bars.

9. Electrical apparatus as in claim 7 wherein the bus bar terminal of each link comprises a cluster of resilient plug-in contact fingers located at the four corners, respectively, of a square.

10. Electrical apparatus for connection to a set of first, second and third parallel bus bars regularly spaced apart in succession and having respective edges in a common plane, said apparatus including
   an electrical device having means constituting at least one pole that comprises first and second terminals,
   means for mounting said electrical device opposite to such a set of bus bars with said first terminal of the electrical device disposed opposite to said second bus bar, and
   an essential rigid link for connecting said first terminal of the device selectively to any one of said three bus bars, said link having a conductor and having a bus bar temrinal and a device terminal interconnected by said conductor, said device temrinal being selectively secured to said first terminal so as to establish any of three attitudes in which the bus bar terminal is in connection-making position relative to any selected one of said three bus bars.

11. Electrical apparatus as in claim 10 wherein said first terminal of the electrical device is a fastener and wherein the device terminal of the link is adjustable about an axis and is then gripped in said adjusted condition by said fastener to secure the bus bar terminal of the link in connection-making position relative to a selected bus bar of said set of bus bars.

12. Electrical apparatus as in claim 11 wherein said device terminal of the link has a keying shape coacting with said fastener to secure said link selectively in any of at least three positions wherein said bus bar terminal of the link is in connection making position relative to a selected bus bar.

13. Electrical apparatus as in claim 10 wherein said link is adjustable to extend in any of three directions from the first temrinal of the electrical device two of said directions being opposite to each other and the third direction being perpendicular to said two directions, for locating said bus bar terminal in position for bar contactingto a selected one of said bus bars.

14. Electrical apparatus as in claim 13 wherein said bus bar terminal comprises four contact fingers at the corners of an imaginary square for making contact with a selected bus bar when the link extends in any of said three directions.

15. Electrical apparatus as in claim 10, including additional means constituting additional poles each having a first terminal disposed opposite to said second bus bar when said additional poles are mounted by said mounting means, said apparatus further having links interchangeable with the first-mentioned link for connecting said first terminal of each of said additional poles to any of said bus bars, selectively.

16. Electrical apparatus including a set of at least three parallel bus bars having longitudinal edges disposed in a common plane, electrical device means comprising multiple poles having respective electrical terminals disposed in a row at spaced-apart positions, said row being parallel to said bus bars and spaced from said common plane, and multiple links shaped and proportioned alike and being interchangeable for connecting any of said electrical terminals to any of said bus bars, selectively, each of said links being essentially rigid and having a device terminal and a bus bar terminal and a conductor fixedly interconnecting said device terminal and said bus bar terminal, the device terminal of each of said links being selectively securable to the electrical terminal of a respective one of said poles in any of three selective positions spaced apart angularly about an axis perpendicular to said common plane, the bus bar terminal of each said link being in contact-making relationship with respect to one of said bus bars when said link is in any of said three selective positions.

17. Electrical apparatus as in claim 16 wherein said first terminals of the poles are in a row that is parallel to the bus bars and wherein the conductors of said links extend in various directions from their respective device terminals.

18. Electrical apparatus as in claim 17 wherein said first terminals of the device grip the respective device terminals and wherein the device terminals of the links have keying formations coacting with the first terminals for fixing the conductors of the links in the various directions in which said conductors extend.

19. Electrical apparatus as in claim 17 wherein each of said bus bar terminals of the links comprises a cluster of resilient spring fingers.

20. Electrical apparatus as in claim 16 wherein said links are adapted to extend generally in any of three directions, two of said directions being opposite to each other and the third direction being perpendicular to said two directions, each of the bus bar terminals of the links comprising four spring fingers at the corners of an imaginary square for gripping a bus bar between them in any of said directions of said links.

* * * * *